United States Patent [19]

Clemens et al.

[11] 4,136,358
[45] Jan. 23, 1979

[54] TRANSCODING APPARATUS

[75] Inventors: Jon K. Clemens, Skillman; Michael D. Ross, Somerdale, both of N.J.

[73] Assignee: RCA Corporation, New York, N.Y.

[21] Appl. No.: 808,295

[22] Filed: Jun. 20, 1977

[30] Foreign Application Priority Data

Aug. 9, 1976 [GB] United Kingdom ............... 33118/76

[51] Int. Cl.$^2$ .......................... H04N 9/32; H04N 5/79
[52] U.S. Cl. .......................................... 358/11; 358/4
[58] Field of Search ................... 358/4, 11, 16, 17, 19, 358/31, 36

[56] References Cited

U.S. PATENT DOCUMENTS

| 2,729,698 | 1/1956 | Fredendall | 358/31 |
| 2,855,573 | 10/1958 | Fredendall | 358/31 |

FOREIGN PATENT DOCUMENTS

| 1333886 | 10/1973 | United Kingdom | 358/31 |
| 1333887 | 10/1973 | United Kingdom | 358/31 |

OTHER PUBLICATIONS

Bruch, "Transcoder PAL-NTSC-...", Telefunken-Zeitung, Jg 37 (1964) Heft 2, pp. 115–130.

Primary Examiner—John C. Martin

Attorney, Agent, or Firm—Eugene M. Whitacre; William H. Meager

[57] ABSTRACT

Composite color video signals, of the PAL format, are applied to the input of a 1H delay line (exhibiting a 64 microsecond delay, when $f_H$= 15,625 Hz.). Output of a first comb filter, using additive combination of delay line input and output signals, is applied to a lowpass filter having a cutoff frequency below the lowest PAL color subcarrier sideband frequency. Output of a second comb filter, using subtractive combination of delay line input and output signals, is applied to: (1) a second 1H delay line; (2) a delay device, providing delay correpsonding to a quarter-cycle at the PAL color subcarrier frequency; and (3) a low pass filter having a cutoff frequency below the lowest buried subcarrier sideband frequency. Outputs of two low pass filters are combined to form luminance signal. Outputs of quarter-cycle delay device and second 1H delay device are additively combined to obtain "V" component of PAL signal, and subtractively combined to obtain "U" component thereof. "V" component is synchronously detected, de-switched, and remodulated on R-Y phase of buried subcarrier (e.g., with frequency at $(189/2) f_H + \frac{1}{2} f_V$), while "U" component is synchronously detected, and remodulated on B-Y phase of buried subcarrier. Remodulator outputs are combined with luminance signal to form composite color video output signal.

5 Claims, 1 Drawing Figure

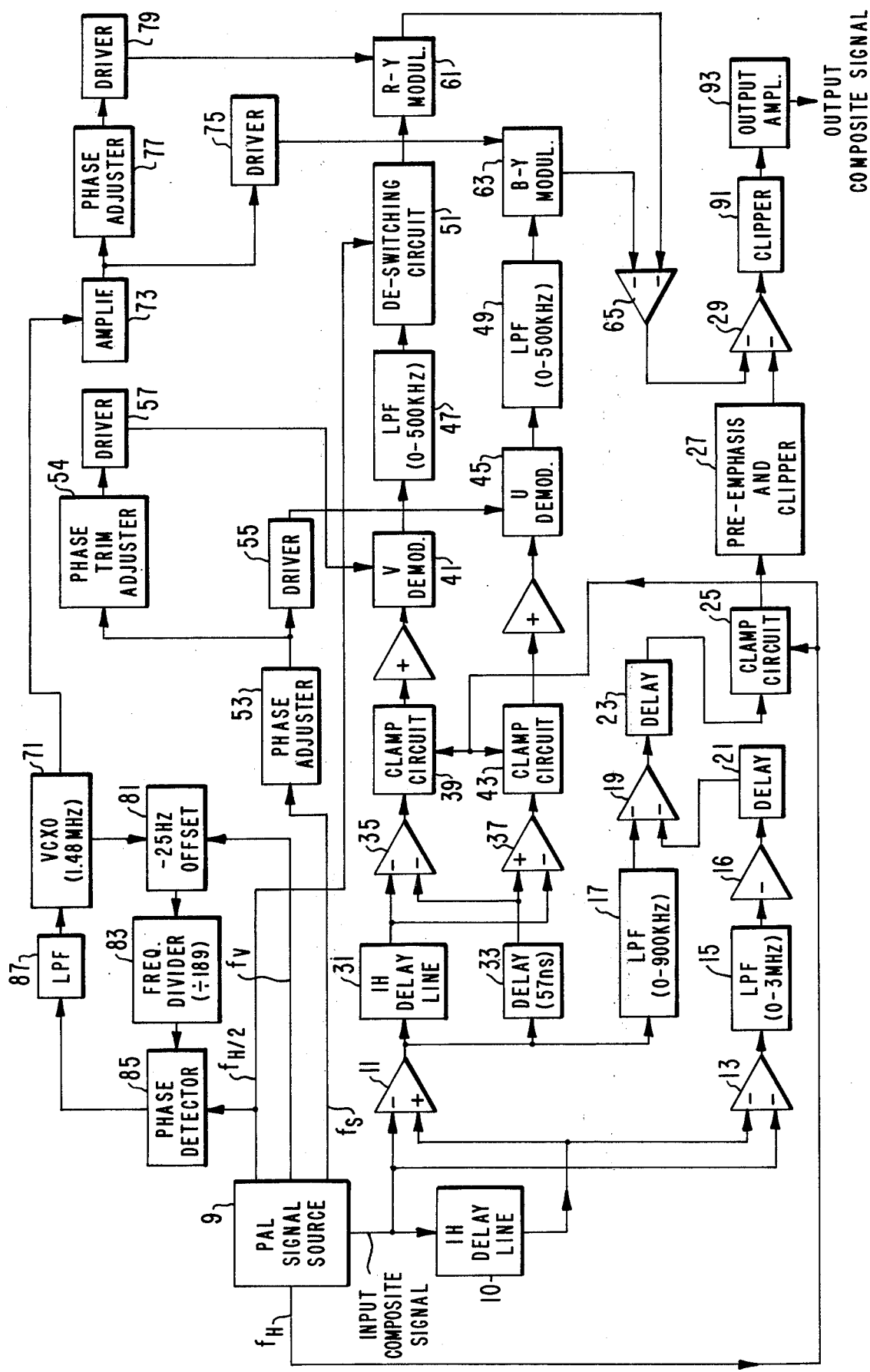

TRANSCODING APPARATUS

The present invention relates to apparatus for transcoding a composite color television signal encoded in the PAL format to a different encoding format, suitable, for example, for video disc recording purposes.

In U.S. Pat. No. 3,872,498 — Pritchard, a color television signal encoding format of a so-called "buried subcarrier" form is disclosed as particularly advantageous for disc recording purposes. In the buried subcarrier format, the chrominance signal falls in a midband portion (e.g., 1-2 MHz.) of the luminance signal. Comb filtering of the luminance signal prior to combination with the chrominance signal prepares troughs in the midband portion of the luminance signal, while comb filtering of the chrominance signal prior to the combination substantially confines the chrominance signal components to the aforesaid trough regions. Choice of the chrominance subcarrier frequency so as to correspond to an odd multiple of half the line frequency facilitates the subsequent separation of the luminance and chrominance components of the buried subcarrier signal upon playback of the disc recording.

In a co-pending British Application, Ser. No. 33,120/76, entitled "VIDEO DISC SYSTEMS", it is recognized that use of a buried subcarrier format, with a subcarrier frequency having the above-described half-line offset characteristic, is particularly advantageous for use in preparing recordings that are conveniently subject to playback by players designed to transform the recovered signal to a form suitable for driving a color television receiver of the PAL type, as well as by players designed to transform the recovered signal to a form suitable for driving a color television receiver of the SECAM type. For use with receivers designed for 50 Hz. field rate, and 15,625 Hz. line rate, a desirable buried subcarrier choice is 189/2 times the line frequency $(f_H)$, which is approximately 1.48 MHz. To reduce visibility of any dot pattern associated with residual buried subcarrier components, the precise subcarrier frequency choice is desirably equal to $(189/2) f_H + 25$ Hz. (1,476,587.5 Hz.), the slight additional offset corresponding to half the field frequency $(f_V)$. Respective quadrature-related phases of the buried subcarrier frequency are modulated by B-Y and R-Y color-difference signals; the line-by-line PAL phase alternation techniques are not employed. To facilitate any subsequent transformation of the recorded signal to PAL form, the phasing of the color synchronizing burst (which is constant, in contrast with the line-by-line shift of the PAL "swinging burst") is shifted 45° from the —(B-Y) phase position normally employed for the constant burst phase of NTSC systems. The luminance signal component of the composite recording signal is illustratively limited to a 0–3 MHz. band.

The present invention is directed to transcoding apparatus for transforming signals encoded in the conventional PAL format to signals encoded in the above-described buried subcarrier format of the aforementioned British application. Such transcoding apparatus may serve advantageously, for example, in the preparation of a video disc recording signal from software available in the form of a PAL video tape recording.

Pursuant to the principles of the present invention, composite color video signals of standard PAL form, derived, for example, from a video tape recorder, are applied to the input of a 1H delay line. A subtractive combiner of the delay line input and output forms a first comb filter having a series of rejection notches at respective even integral multiples of half the line frequency. An additive combiner of the delay line input and output forms a second comb filter having a series of rejection notches centered at respective odd integral multiples of half the line frequency.

An output of the additive combiner is supplied to a low pass filter having a cutoff frequency (e.g., 3 MHz.) below the lowest PAL color subcarrier sideband frequency, while an output of the subtractive combiner is supplied to a low pass filter having a cutoff frequency (e.g., 900 KHz.) below the lowest buried subcarrier sideband frequency to be utilized. The low pass filter outputs are combined to form a luminance signal which (a) is free of chrominance components; (b) has troughs prepared in the midband of its frequency spectrum to avoid undesired crosstalk with buried subcarrier signal components (with which the luminance signal will subsequently be combined); and (c) has an effectively uncombed lowband region (0–900 KHz.), in which vertical detail information has been preserved. Preferably, the combining of the low pass filter outputs is done with an effective poling that results in the lowband information having suffered a one line delay.

Outputs of the first comb filter are also applied to an additional 1H delay line, and to a delay device exhibiting a delay equal to the duration of a quarter-cycle (e.g., 57 nanoseconds) of the PAL color subcarrier frequency. Additive combination of the outputs of the quarter-cycle delay device and the additional 1H delay line provides a separated "V" component of the PAL signal, which is (a) freed from accompaniment by the "U" component of the PAL signal, and (b) lacking in components falling in broad rejection notches in the frequency spectrum centered about even integral multiples of half the line frequency (the breadth of the rejection notches exceeding those provided by a 1H comb filter, and substantially corresponding to those provided by a 2H comb filter). Subtractive combination of the outputs of the quarter-cycle delay device and the additional 1H delay line provides a separated "U" component of the PAL signal, which is (a) freed from accompaniment by the "V" component of the PAL signal, and (b) lacking in components falling in the aforesaid broad rejection notches.

Detection of the respective separated "U" and "V" components, by synchronous detection techniques, using reference waves at the PAL color subcarrier frequency derived from the PAL signal source, permits recovery of separate B-Y and R-Y color-difference signals, which are filtered to limit them to the bandwidth (e.g., 0–500 KHz.) desired for the buried subcarrier format. The line-by-line polarity alternations of the recovered R-Y signal are removed by de-switching apparatus, under the control of waves at half line frequency derived from the PAL signal source.

The recovered B-Y color difference signal, and the de-switched R-Y color difference signal, are remodulated on respective, quadrature-related phases of subcarrier waves of the desired buried subcarrier frequency (e.g., 1.4765875 MHz.) provided by an oscillator. Desirably, the oscillator takes the form of a voltage controlled oscillator and is disposed in a phase locked loop, which responds to half line frequency and field frequency waves derived from the PAL signal source, and is arranged to effect phase locking of the subcarrier waves to the PAL input signal, and to establish the subcarrier frequency at a value corresponding to the sum of an odd integral multiple of the line frequency and half the field frequency. The outputs of the respective remodulators are combined to form a buried subcarrier chrominance signal, which falls in the midband region of the frequency spectrum of the luminance signal and is confined to spectral regions centered about the troughs therein previously mentioned.

Combination of the separated luminance signal with the buried subcarrier chrominance signal forms an output composite signal in the desired buried subcarrier format.

Where the composite signal is to be used in the preparation of a video disc recording signal of the general form described in U.S. Pat. No. 3,911,476 — Keizer, the luminance signal desirably is subject to high frequency pre-emphasis, and then subject to double-ended clipping, prior to combination with the buried subcarrier chrominance signal, and the resultant composite signal is subject to additional double-ended clipping prior to use in recording signal formation.

In the accompanying drawing, a block diagram illustration is presented of transcoding apparatus pursuant to an embodiment of the present invention.

As shown in the drawing a 1H delay line 10 (e.g., providing a delay of 64 microseconds, corresponding to one period at a line frequency of 15,625 Hz.) accepts at its input end a composite color video signal of standard PAL form. The PAL signal source 9 is illustratively a video tape recorder (e.g., of the RCA TR-70 type), and an associated PAL sync generator providing outputs at line frequency $f_H$ (e.g., 15, 625 Hz.), at field frequency $f_V$ (e.g., 50 Hz.) at half line frequency $f_H/2$ (e.g., 7,812.5 Hz), and at the PAL subcarrier frequency $f_S$ (e.g., 4.4336875 MHz.), in addition to the composite video signals supplied to delay line 10.

The signal at the output end of delay line 10 is (a) subtractively combined with the input signal in signal combiner 11, and (b) additively combined with the input signal in signal combiner 13. Delay line 10 in combination with the subtractive signal combiner 11 forms a first comb filter having a series of rejection notches centered at respective even integral multiples of half the line frequency, while delay line 10 in combination with the additive signal combiner 13 forms a second comb filter having a series of rejection notches centered at respective odd integral multiples of half the line frequency.

Major PAL chrominance signal components, which fall at frequencies shifted from integral multiples of the line frequency by a quarter of the line frequency, are passed by the first comb filter (with some attenuation) and appear at the output of combiner 11, freed from accompaniment by those major luminance signal components which fall at integral multiples of the line frequency.

The PAL luminance signal appears at the output of combiner 13, with major components of the type rejected by the first comb filter retained. The action of the second comb filter has, however, subjected the luminance signal to effective component removal in those regions of its frequency spectrum which are centered about odd integral multiples of half the line frequency. Major PAL chrominance components, falling at frequencies offset from the second comb filter peaks by a quarter line frequency spacing, are not effectively removed by the action of the second comb filter, and appear (with some relative attenuation) along with the passed luminance signal components at the output of combiner 13, which is coupled to the input of a low pass filter 15. The passband of filter 15 is limited to the restricted bandwidth (e.g., 0-3 MHz.) desired for the luminance components of the recording signal. The cutoff frequency (3 MHz.) of the lowpass filter 15 falls below the lowest PAL subcarrier sideband frequency, wherefore the luminance signal components passed by filter 15 are freed from accompaniment by PAL chrominance components.

The frequency spectrum of the luminance signal output of filter 15 has troughs in its midband region (e.g., 1-2 MHz.), as desired for interference-free occupancy by buried subcarrier sidebands to be subsequently added thereto; the frequency spectrum of the output of filter 15, however, additionally has troughs below such midband region which are not required for buried subcarrier sideband occupancy. Moreover, the introduction of such lowband troughs has involved removal from the luminance signal of components which can contribute significantly to proper rendition of vertical detail in the pictures subject to recording. Such vertical detail components, while absent from the output of filter 15, are present in the lowband portion of the output of the first comb filter (i.e., at the output of the subtractive combiner 11). By passing the output of combiner 11 through a lowpass filter 17 having a cutoff frequency (e.g., 900 KHz.) below the lower boundary of the midband region to be occupied by the buried subcarrier form of chrominance signal, a vertical detail signal is obtained that can be recombined with the (vertical detail deficient) luminance signal output of filter 15 to effectively fill in undesired lowband troughs, without introducing an undesired filling in of the midband troughs. The desired recombination is effected by additive combiner 19, which receives the respective outputs of filters 15 and 17. The signal path provided between the output of filter 15 and an input of combiner 19 includes a delay device 21. The delay device 21 provides a delay for the combed luminance signal output of filter 15 of a magnitude substantially corresponding to the difference between the signal delay introduced by the relatively wideband filter 15 and the greater delay imparted to the vertical detail signal by the relatively narrowband filter 17, so as to substantially equalize the delays suffered by the respective components being recombined in combiner 19.

The luminance signal output of combiner 19 is delayed (by delay apparatus 23, for purposes of equalization of luminance and chrominance delays), clamped (by keyed clamp circuit 25) to restore its DC component, and then subjected to pre-emphasis of its high frequency components and a subsequent double-ended clipping (by pre-emphasis/clipping circuits 27), prior to application to a luminance/chrominance signal combiner 29. The chrominance signal input to combiner 29 is formed from the PAL chrominance information separated by the first comb filter, and appearing at the output of combiner 11, by techniques to be now described.

An output of combiner 11 is applied to the input of a second 1H delay line 31, as well as to the input of a delay device 33. The delay device 33 provides a delay of approximately 57 nanoseconds, which substantially corresponds to a quarter cycle at the PAL subcarrier frequency of 4,433,618.75 Hz, while the 64 microsecond delay provided by delay line 31 substantially corresponds to 283¾ cycles at the PAL subcarrier frequency. The respective outputs of 1H delay line 31 and delay device 33 are: (a) additively combined by combiner 35; and (b) subtractively combined by combiner 37. The "V" subcarrier component of the PAL signal (which component is subject to line-by-line phase reversal) appears in co-phasal relationship in the respective outputs of delay line 31 and delay device 33, while the "U" subcarrier component of the PAL signal (which is not subject to line-by-line phase reversal) appears in antiphasal relationship in the respective outputs of delay line 31 and delay device 33. Combiner 35 accordingly effects cancellation of the U component, while passing the V component; combiner 37 effects cancellation of the V component, while passing the U component.

The V component output of combiner 35, subject to the clamping action of a keyed clamp circuit 39, is supplied as an input to a demodulator 41, which also receives a PAL subcarrier frequency reference input of an appropriate phase for effecting synchronous detection of the R-Y color-difference signal modulation of the V carrier component. A second demodulator 45, responsive to the output of combiner 37 (after clamping by keyed clamp circuit 43) and to a scond PAL subcarrier frequency reference input, effects synchronous detection of the B-Y color-difference signal modulation of the U carrier component. Respective lowpass filters 47, 49 restrict the outputs of the respective demodulators (41, 45) to color-difference signals of a bandwidth (e.g., 0–500 KHz.) desired for buried subcarrier signal formation. The effect of the line-by-line phase reversal of the V component of the PAL signal on the polarity of the recovered R-Y signal information is removed by de-switching apparatus 51, to which the output of the R-Y lowpass filter 47 is applied. The de-switching apparatus 51 reverses the polarity of the output of filter 47 on alternate lines, under the control of PAL switch drive input waves of half line frequency derived from the PAL signal source. It will be readily recognized that other de-switching techniques (e.g., such as inverting the phase of the reference input during alternate lines) may alternatively be employed.

To obtain the reference inputs for demodulators 41 and 45, PAL subcarrier frequency waves in appropriate synchronism with the PAL input signal are derived from the PAL signal source and applied to a phase adjuster 53, providing a facility for common adjustment of the phasing of the two demodulator reference inputs supplied by respective drivers 55, 57. A second phase adjuster 54, interposed between phase adjuster 53 and driver 57, permits trimming of the phase of the reference input supplied by driver 57. By virtue of the nature of the operation of the U/V separator (31, 33, 35, 37), similar phasing is required for the two demodulator reference inputs.

The R-Y signal output of the de-switching apparatus 51 is applied to a modulator 61 to effect amplitude modulation of carrier waves of the "buried subcarrier" frequency and of a first constant phase, while the B-Y signal output of filter 49 is applied to a modulator 63 to effect amplitude modulation of carrier waves of the buried subcarrier frequency and of a second constant phase, in quadrature with the first phase. The outputs of the respective modulators, which are illustratively of doubly balanced form, are summed by a signal combiner 65 to form the buried subcarrier chrominance signal input for the previously mentioned luminance/chrominance signal combiner 29.

The carrier wave input for modulator 63 is developed by an oscillator 71 and supplied thereto via amplifier 73 and driver 75. A phase adjuster 77 is interposed between the output of amplifier 73 and the input of the carrier wave driver (79) for modulator 61, in order to establish the desired quadrature phase relationship between the respective carrier wave inputs.

In order to ensure that the output of oscillator 71 bears the frequency relationship to the PAL signal line and field frequencies desired for the buried subcarrier frequency (i.e., is equal to $(189/2) f_H + \frac{1}{2} f_V$) and is phase locked to the PAL input signal, the oscillator 71 takes the form of a voltage controlled oscillator and is disposed in a phase-locked loop which responds to half line frequency and field frequency waves derived from the PAL signal source. An output of oscillator 71 is supplied to half field frequency offset apparatus 81 along with field drive input waves derived from the PAL signal source. Illustratively, the offset apparatus may be of the general form described on page 98 of the Carnt and Townsend book, entitled "COLOUR TELEVISION-Volume 2" and published by Iliffe Books, Ltd., London, England in 1969. The offset apparatus 81 is particularly adjusted to develop an output having a frequency corresponding to the oscillator output frequency minus half the field frequency of the PAL input signal. This output of the offset apparatus 81 is applied to the input of a frequency divider 83, which provides output waves at a frequency which is 1/189 of the frequency of the divider's input. The divider output, together with PAL switch drive input signals (of half line frequency) derived from the PAL signal source, are supplied as inputs to a phase detector 85. The output of phase detector 85 is filtered by a low pass filter 87 to develop a control voltage for application to oscillator 71. The control voltage is applied to oscillator 71 in such sense as to oppose departures from frequency and phase synchronism between the respective inputs to phase detector 85.

The composite signal output of combiner 29, in the desired buried subcarrier format, is applied via a double-ended clipper 91 to an output amplifier 93. The output of amplifier 93 is in a form suitable for application to a picture carrier frequency modulator for development of an FM recording signal of a type described, for example, in U.S. Pat. No. 3,911,476. The presence of clipper 91 in the composite signal path permits establishment of precise limits of the picture carrier frequency deviation range at desired boundary frequencies. The preclipping (by unit 27) of the pre-emphasized luminance signal components prior to combination with the buried subcarrier chrominance components minimizes introduction of undesired edge effects by the clipping process, as explained more fully in a co-pending British Application, Ser. No. 33,119/76, entitled "COLOR VIDEO SIGNAL PROCESSING CIRCUITS".

It may be noted that the previously described arrangement of elements 10, 11, 31, 33, 35 and 37 enables (a) essentially cross-talk free separation of U and V components, for reasons explained on pages 168–9 of the aforementioned Carnt and Townsend book, while (b) simultaneously effecting, by a double combing action, the confinement of chrominance signal components desired for interference reduction in subsequent buried subcarrier signal formation. The elements 10, 11 additionally serve, in conjunction with element 17, the further purpose of providing a convenient vertical detail signal source. Element 10 is put to still further use by its association with elements 13, 15 in the development of a chrominance-free luminance signal with the midband region spectrum troughs desired for interference reduction in the subsequent buried subcarrier signal formation.

It may be noted that an "extra" phase inversion stage 16 is incorporated in the path for the combed luminance signal input to combiner 19, while no counterpart phase inversion stage is provided for the vertical detail signal input thereto. The consequence is that low frequency information, occupying the "filled in" (i.e., effectively uncombed) lowband region (e.g., 0–900 KHz.) of the frequency spectrum of the output signal of combiner 19, has suffered a 1H delay. This is a result because low frequency information from the delay line input (i.e., 0H information) is effectively cancelled in the additive combiner 19, with the vertical detail path thereto providing a net polarity reversal therefor, while the combed luminance signal path thereto provides no net polarity reversal therefor. The desirability of providing a 1H delay for the uncombed lowband luminance components in the transcoding process at the recorder is (as described in the aforementioned U.S. Pat. No. 3,872,498) that it allows use of lowband bypassing of delay line structures in subsequent player handling of the buried subcarrier signal, without producing an exaggerated vertical separation of lowband components from other related picture components in the ultimate picture display.

For optimum delay matching of luminance and chrominance information, it will be appropriate for the luminance delay apparatus 23 to incorporate a 1H delay line so as to reduce unnecessary vertical separation, as well as horizontal separation, of correlated luminance and chrominance information.

It will be noted that the separated "V" component appearing at the output of additive combiner 35 is accompanied by the "V" component of the "swinging brust" of the PAL input signal, which component is subject to phase reversal in successive bursts. When subject to the demodulating action of detector 41, output pulses of alternating polarity result during successive burst intervals. The polarity reversal of these burst interval pulses is eliminated, however, by the action of de-switching apparatus 51. Remodulator 61 therefore produces a constant phase R-Y burst component during successive burst intervals. The "U" burst component at the output of subtractive combiner 37 is of constant phase, effectively corresponding to −(B-Y), and provides constant polarity burst interval pulses (of like magnitude to those provided by detector 41) at the output of detector 45. Remodulator 63 therefore produces a constant phase −(B-Y) burst component during successive burst intervals. The output chrominance signal formed by combining the remodulator outputs thus is accompanied by successive color synchronizing bursts of constant phase, with the phase shifted by 45° from the −(B-Y) phase, as desired for the recording purposes explained in the aforementioned British Application No. 33,120/76.

What is claimed is:

1. Transcoding apparatus, for use with a source of input composite color video signals including luminance signals and associated deflection synchronizing signals at respective line and field frequencies, and chrominance signals encoded in the PAL format and comprising modulated color subcarrier waves occupying a given band of frequencies, and accompanied by color synchronizing bursts of PAL subcarrier frequency; said transcoding apparatus comprising:

a source of output subcarrier waves of a frequency substantially corresponding to a given odd multiple of half said line frequency;

first comb filter means for subjecting said input composite signals to a first frequency response characteristic exhibiting a plurality of rejection notches at frequencies corresponding to respective odd multiples of half said line frequency;

a first low pass filter coupled to the output of said first comb filter means, and having a cutoff frequency below the lowest frequency in said given band and spaced above said output subcarrier wave frequency by a first frequency difference;

second comb filter means for subjecting said input composite signals to a second frequency response characteristic exhibiting a plurality of rejection notches at frequencies corresponding to respective even multiples of half said line frequency;

a second low pass filter coupled to the output of said second comb filter means, and having a cutoff frequency spaced below said output subcarrier wave frequency by a second frequency difference;

a delay line exhibiting a delay substantially corresponding to one period at said line frequency, and coupled to the output of said second comb filter means;

a delay device exhibiting a delay substantially corresponding to a quarter of a period at said PAL subcarrier frequency;

means for summing the outputs of said delay line and said delay device;

detector means, responsive to the output of said summing means, for developing a first color difference signal output, confined to frequencies less than each of said frequency differences;

means for subtractively combining the outputs of said delay line and said delay device;

detector means, responsive to the output of said subtractive combining means, for developing a second color difference signal output, confined to frequencies less than each of said frequency differences;

first modulator means for modulating subcarrier waves of a first phase, derived from said output subcarrier wave source, in accordance with said first color difference signal output;

second modulator means for modulating subcarrier waves of a second phase, in quadrature relationship to said subcarrier waves of said first phase and derived from said output subcarrier wave source, in accordance with said second color difference signal output; and means for combining the outputs of said first and second modulator means and said first and second low pass filters to form output composite color video signals.

2. Transcoding apparatus, for use with a source of input composite color video signals including luminance signals and associated deflection synchronizing signals at respective line and field frequencies, and chrominance signals encoded in the PAL format and comprising modulated PAL color subcarrier waves occupying a given band of frequencies, and accompanied by color synchronizing bursts of PAL subcarrier frequency; said transcoding apparatus comprising:

a source of output subcarrier waves of a frequency corresponding to the sum of a given odd multiple of half said line frequency and half said field frequency;

first comb filter means for subjecting said input composite signals to a first frequency response characteristic exhibiting a plurality of rejection notches at frequencies corresponding to respective odd multiples of half said line frequency;

a first low pass filter coupled to the output of said first comb filter means, and having a cutoff frequency below the lowest frequency in said given band and spaced above said output subcarrier wave frequency by a first frequency difference;

second comb filter means for subjecting said input composite signals to a second frequency response characteristic exhibiting a plurality of rejection notches at frequencies corresponding to respective even multiples of half said line frequency;

a second low pass filter coupled to the output of said second comb filter means, and having a cutoff frequency spaced below said output subcarrier wave frequency by a second frequency difference;

adding means for combining the outputs of said low pass filters;

a delay line exhibiting a delay substantially corresponding to one period at said line frequency, and coupled to the output of said second comb filter means;

a delay device exhibiting a delay substantially corresponding to a quarter of a period at said PAL subcarrier frequency;

means for summing the outputs of said delay line and said delay device;

means, including a first synchronous detector responsive to reference waves at said PAL subcarrier frequency and to the output of said summing means, for developing a first color difference signal output, said first color difference signal output developing means also including filter means for confining said first color difference signal output to frequencies less than each of said frequency differences;

means for subtractively combining the outputs of said delay line and said delay device;

means, including a second synchronous detector responsive to reference waves at said PAL subcarrier frequency and to the output of said subtractive combining means, for developing a second color difference signal output, said second color difference signal output developing means also including filter means for confining said second color difference signal output to frequencies less than each of said frequency differences;

first modulator means for modulating subcarrier waves of a first phase, derived from said output subcarrier wave source, in accordance with said first color difference signal output;

second modulator means for modulating subcarrier waves of a second phase, in quadrature relationship to said subcarrier waves of said first phase and derived from said output subcarrier wave source, in accordance with said second color difference signal output; and means for combining the outputs of said first and second modulator means and said adding means to form output composite color video signals.

3. Transcoding apparatus, for use with a source of input composite color video signals including luminance signals and associated deflection synchronizing signals at respective line and field frequencies, and chrominance signals encoded in the PAL format and comprising modulated color subcarrier waves occupying a given band of frequencies, and accompanied by color synchronizing bursts of PAL subcarrier frequency; said modulated color subcarrier waves corresponding to the sum of (a) color subcarrier waves of said PAL subcarrier frequency and of a first phase, modulated by a first color difference signal, and (b) color subcarrier waves of said PAL subcarrier frequency and of a second phase, modulated by a second color difference signal in one polarity during alternate line intervals and in the opposite polarity during the intervening line intervals; said transcoding apparatus comprising:

a source of output subcarrier waves of a frequency corresponding to the sum of a given odd multiple of half said line frequency and half said field frequency;

first comb filter means for subjecting said input composite signals to a first frequency response characteristic exhibiting a plurality of rejection notches at frequencies corresponding to respective odd multiples of half said line frequency;

a first low pass filter coupled to the output of said first comb filter means, and having a cutoff frequency below the lowest frequency in said given band and spaced above said output subcarrier wave frequency by a first frequency difference;

second comb filter means for subjecting said input composite signals to a second frequency response characteristic exhibiting a plurality of rejection notches at frequencies corresponding to respective even multiples of half said line frequency;

a second low pass filter coupled to the output of said second comb filter means, and having a cutoff frequency spaced below said output subcarrier wave frequency by a second frequency difference;

adding means for combining the outputs of said low pass filters;

a delay line exhibiting a delay substantially corresponding to one period at said line frequency, and coupled to the output of said second comb filter means;

a delay device exhibiting a delay substantially corresponding to a quarter of a period at said PAL subcarrier frequency;

means for subtractively combining the outputs of said delay line and said delay device;

means, including a first synchronous detector responsive to reference waves at said PAL subcarrier frequency and to the output of said subtractive combining summing means, for recovering said first color difference signal, said first color difference signal recovering means also including filter means for confining said recovered first color difference signal to frequencies less than each of said frequency differences;

means for additively combining the outputs of said delay line and said delay device;

means, including a second synchronous detector responsive to reference waves at said PAL subcarrier frequency and to the output of said additive combining means, for recovering said second color difference signal, said second color difference signal recovering means also including filter means for confining said recovered second color difference signal to frequencies less than each of said frequency differences, and deswitching means controlled at half said line frequency for rendering the polarity of said recovered second color difference signal alike in successive line intervals;

first modulator means for modulating subcarrier waves of a first phase, derived from said output subcarrier wave source, in accordance with said recovered first color difference signal;

second modulator means for modulating subcarrier waves of a second phase, in quadrature relationship to said subcarrier waves of said first phase and derived from said output subcarrier wave source, in accordance with said recovered second color difference signal; and means for combining the outputs of said first and second modulator means and said adding means to form output composite color video signals.

4. Apparatus in accordance with claim 3 wherein said source of output subcarrier waves comprises:

a voltage controlled oscillator;

means, responsive to an output of said oscillator and to waves of half field frequency derived from said input signal source, for developing a frequency shifted output having a frequency which differs from the frequency of said oscillator output by a frequency substantially corresponding to said half field frequency;

a frequency divider, responsive to said frequency shifted output, and exhibiting a frequency division factor corresponding to said given multiple;

a phase detector, responsive to the output of said frequency divider and to waves of half line frequency derived from said input signal source, for developing a control voltage indicative of departures from a predetermined phase relationship between said frequency divider output and said half line frequency waves; and means for controlling the operating frequency of said oscillator in accordance with control voltage in a sense to oppose said departures.

5. Transcoding apparatus, for use with a source of input composite color video signals including luminance signals and associated deflection synchronizing signals at respective line and field frequencies, and chrominance signals encoded in the PAL format and comprising modulated color subcarrier waves occupying a given band of frequencies, and accompanied by color synchronizing bursts of PAL subcarrier frequency; said modulated color subcarrier waves corresponding to the sum of (a) color subcarrier waves of said PAL subcarrier frequency and of a first phase, modulated by a first color difference signal, and (b) color subcarrier waves of said PAL subcarrier frequency and of a second phase, in quadrature to said first phase, modulated by a second color difference signal in one polarity during alternate line intervals and in the opposite polarity during the intervening line intervals; said color synchronizing bursts corresponding to the sum of (1) a first color subcarrier burst component of said first phase and a given amplitude and (2) a second color subcarrier burst component of said given amplitude and of a phase alternating between a phase leading said first phase by 90° and a phase lagging said first phase by 90°; said transcoding apparatus comprising:

a source of output subcarrier waves of a frequency corresponding to the sum of a given odd multiple of half said line frequency and half said field frequency;

first comb filter means for subjecting said input composite signals to a first frequency response characteristic exhibiting a plurality of rejection notches at frequences corresponding to respective odd multiples of half said line frequency;

a first low pass filter coupled to the output of said first comb filter means, and having a cutoff frequency below the lowest frequency in said given band and spaced above said output subcarrier wave frequency by a first frequency difference;

second comb filter means for subjecting said input composite signals to a second frequency response characteristic exhibiting a plurality of rejection notches at frequencies corresponding to respective even multiples of half said line frequency;

a second low pass filter coupled to the output of said second comb filter means, and having a cutoff frequency spaced below said output subcarrier wave frequency by a second frequency difference;

adding means for combining the outputs of said low pass filters to form an output luminance signal;

a delay line exhibiting a delay substantially corresponding to one period at said line frequency, and coupled to the output of said second comb filter means;

a delay device exhibiting a delay substantially corresponding to a quarter of a period at said PAL subcarrier frequency;

means for subtractively combining the outputs of said delay line and said delay device;

means, including a first synchronous detector responsive to reference waves at said PAL subcarrier frequency and to the output of said subtractive combining summing means, for recovering said first color difference signal and pulses representative of said first color subcarrier wave component, said first signal recovering means also including filter means for confining said recovered first color difference signal to frequencies less than each of said frequency differences;

means for additively combining the outputs of said delay line and said delay device;

means, including a second synchronous detector responsive to reference waves at said PAL subcarrier frequency and to the output of said additive combining means, for recovering said second color difference signal and pulses representative of said second color subcarrier wave component, said second signal recovering means also including filter means for confining said recovered second color difference signal to frequencies less than each of said frequency differences, and deswitching means controlled at half said line frequency for rendering the polarity of said recovered second color difference signal alike in successive line intervals and for rendering alike the polarity of successive ones of said recovered pulses;

first modulator means for modulating subcarrier waves of a first phase, derived from said output subcarrier wave source, in accordance with said output of first signal recovering means;

second modulator means for modulating subcarrier waves of a second phase, in quadrature relationship to said subcarrier waves of said first phase and derived from said output subcarrier wave source, in accordance with the output of said second signal recovery means;

means for combining the outputs of said first and second modulator means to form an output chrominance signal occupying a band of frequencies surrounding said output subcarrier wave frequency and accompanied by color synchronizing bursts of output subcarrier wave frequency, of fixed phase, and of fixed amplitude; and means responsive to said output luminance signal and said output chrominance signal for forming output composite color video signals.

* * * * *